G. JOHNSTON, J. CAIRNS & M. K. JOHNSTON.
COTTON-STALK CUTTER.

No. 186,479. Patented Jan. 23, 1877.

Witnesses.
C. W. Brown
M. Church

Inventors.
Geo. Johnston
John Cairns
M. K. Johnston
by their Attys.
Hill & Ellsworth

UNITED STATES PATENT OFFICE.

GEORGE JOHNSTON, JOHN CAIRNS, AND MICHAEL K. JOHNSTON, OF CALDWELL, TEXAS.

IMPROVEMENT IN COTTON-STALK CUTTERS.

Specification forming part of Letters Patent No. 186,479, dated January 23, 1877; application filed July 9, 1874.

*To all whom it may concern:*

Be it known that we, GEORGE JOHNSTON, JOHN CAIRNS, and MICHAEL K. JOHNSTON, of Caldwell, in the county of Burleson and State of Texas, have invented a new and Improved Cotton-Stalk Cutter; and we do hereby declare the following to be a full, clear, and exact description of the same, reference being had to the accompanying drawings, forming part of this specification, in which—

Figure 1:
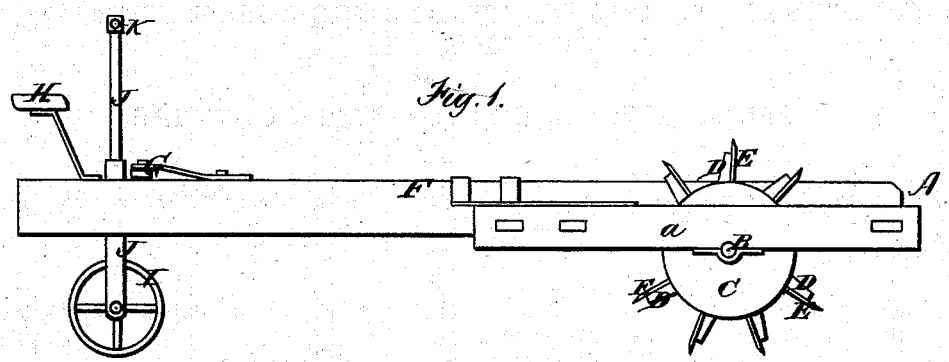
Figure 2:
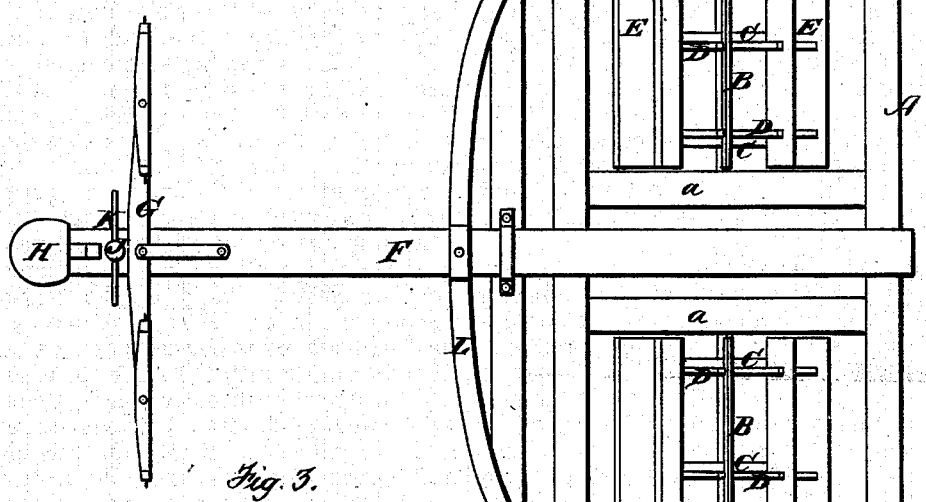

Figure 1 is a side elevation; Fig. 2, a top plan view; and Fig. 3, a detail view, showing the connection of the adjustable cutting-blades.

Similar letters of reference in the accompanying drawings denote the same parts.

Our invention has for its object to improve the construction and operation of that class of machines which are employed for cutting cotton and other stalks left in the field, so that they may be easily plowed under, and not left to obstruct the subsequent cultivation of the soil.

The general construction of these machines embraces a frame-work, wherein are hung one or more rotary cylinders, or equivalent devices, having a series of parallel peripheral cutters, which, when the machine is moved over the ground, rotate with the cylinders, and sever the stalks into short lengths.

Our present invention consists in making the cutters adjustable radially, for the purpose of adapting the machine for cutting large and small stocks with equal facility, as we will presently describe.

Figure 3:
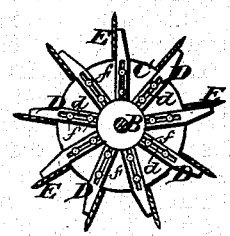

In the drawings, A represents a rectangular frame, provided with cross-bars $a\ a$, containing the bearings of two shafts, B, said shafts being in line with each other, and on opposite sides of the center of the frame. The shafts B are provided with a suitable number of flanges or disks, C, to which are bolted radial slotted arms D, said arms radiating from the shafts, as shown in Fig. 3. E represents cutting-blades, suitably attached to the outer ends of the arms D, parallel with the shafts B. The arms D are provided with longitudinal slots $d$, through which the bolts $f\ f$ pass, that attach them to the disks C; hence, the arms, with their blades, are adapted to be adjusted so as to move the blades toward or away from the shafts.

By this adjustability the diameter of the cylinders, formed by the disks and blades, is increased or diminished from opposite cutting-edges, as occasion requires. For example, in cutting light stalks the blades are retracted, thereby reducing the diameter of the cylinders, so as to cut the stalks properly, and at the same time prevent the blades from entering the ground to such an extent as to increase the draft of the machine. In cutting large heavy stocks the blades are adjusted radially outward to present but one cutting-edge to the stalks at a time, and thereby throw the whole weight of the machine upon each cutter successively, to insure the severance of the stalks.

The front end of the frame A is supported by the rotary cutters, the edges of the blades E coming in contact with the surface of the ground, and cutting the stalks thereon into lengths corresponding to the distance between the blades. F represents a longitudinal beam affixed to the center of the frame A, at right angles with the shafts B, and extending backward sufficiently far to admit of the attachment of the team between its rear end and the frame A. The beam F is provided at its rear end with a suitable draft attachment, G, a driver's seat, H, and a caster-wheel, I, the standard J of the latter passing upward through the beam, and being provided on its upper end with a tiller, K, located in convenient proximity to the driver's seat.

The team is attached to the draft attachment G, and the machine is propelled thereby, the cutters preceding the animals. The caster-wheel supports the weight of the rear end of the frame, and the driver is enabled by the tiller to guide the machine in any desired direction.

Owing to the open construction of the rotary cutters there is no surface to which the soil can adhere in large quantities. The construction of the cutters is cheap and simple, and they are not liable to get out of order.

The propelling-beam F is strengthened in its attachment to the frame A by a curved brace, L, as shown in Fig. 2.

We claim as our invention—

In a stalk-cutter, the combination of the disks C, mounted on the shafts B, with the slotted radial arms D, carrying the cutters E, and the bolts $f$, whereby said blades can be adjusted nearer to, or farther from, the shafts, substantially as described, for the purpose specified.

GEORGE JOHNSTON.
JOHN CAIRNS.
MICHAEL KENNEDY JOHNSTON.

Witnesses:
WM. K. HOMAN,
THOMAS M. HUNT.